United States Patent [19]
Elhaus

[11] Patent Number: 4,566,298
[45] Date of Patent: Jan. 28, 1986

[54] PROFILE EXTRUDER INCLUDING PULL MEASURING MEANS

[76] Inventor: Friedrich W. Elhaus, Dorfstrasse 21, D-7761 Moos, Fed. Rep. of Germany

[21] Appl. No.: 605,177

[22] Filed: Apr. 30, 1984

[30] Foreign Application Priority Data

May 3, 1983 [DE] Fed. Rep. of Germany ....... 3316161

[51] Int. Cl.$^4$ ..................... B21C 35/01; B21C 51/00
[52] U.S. Cl. ........................... 72/6; 72/257; 72/290; 72/422
[58] Field of Search ........................................ 72/6-8, 72/257, 290, 293, 301, 302, 422

[56] References Cited

U.S. PATENT DOCUMENTS

| | | | |
|---|---|---|---|
| 2,824,594 | 2/1958 | Gray | 72/8 |
| 3,302,437 | 2/1967 | Dolney | 72/302 |
| 3,537,286 | 11/1970 | Spielvogel et al. | 72/257 |
| 3,564,883 | 2/1971 | Koors et al. | 72/8 |
| 4,307,597 | 12/1981 | Elhaus et al. | 72/257 |
| 4,501,135 | 2/1985 | Chivens et al. | 72/302 |

FOREIGN PATENT DOCUMENTS

| | | | |
|---|---|---|---|
| 615546 | 2/1961 | Canada | 72/8 |
| 662192 | 5/1979 | U.S.S.R. | 72/302 |

*Primary Examiner*—Lowell A. Larson
*Attorney, Agent, or Firm*—Laubscher & Laubscher

[57] ABSTRACT

A pull measuring system used in a puller for extrusion profiles being extruded out of an extruder comprises a divided puller head (14) having its parts (30,31) supported for pivoting movement with respect to each other about an axis (32) which extends transversely of the direction of pull. In operation a tie bar (39) fixed to the part (31) carrying the clamping grippers for the extrusion profiles acts in the direction of pull on a force detector (34) fixed to the other part (30) which is arranged at a cantilever (13) of a carriage. In this manner the pull prevailing in operation and being transmitted by the puller to the extrusion profiles can be sensed reliably and accurately under any operating conditions.

5 Claims, 4 Drawing Figures

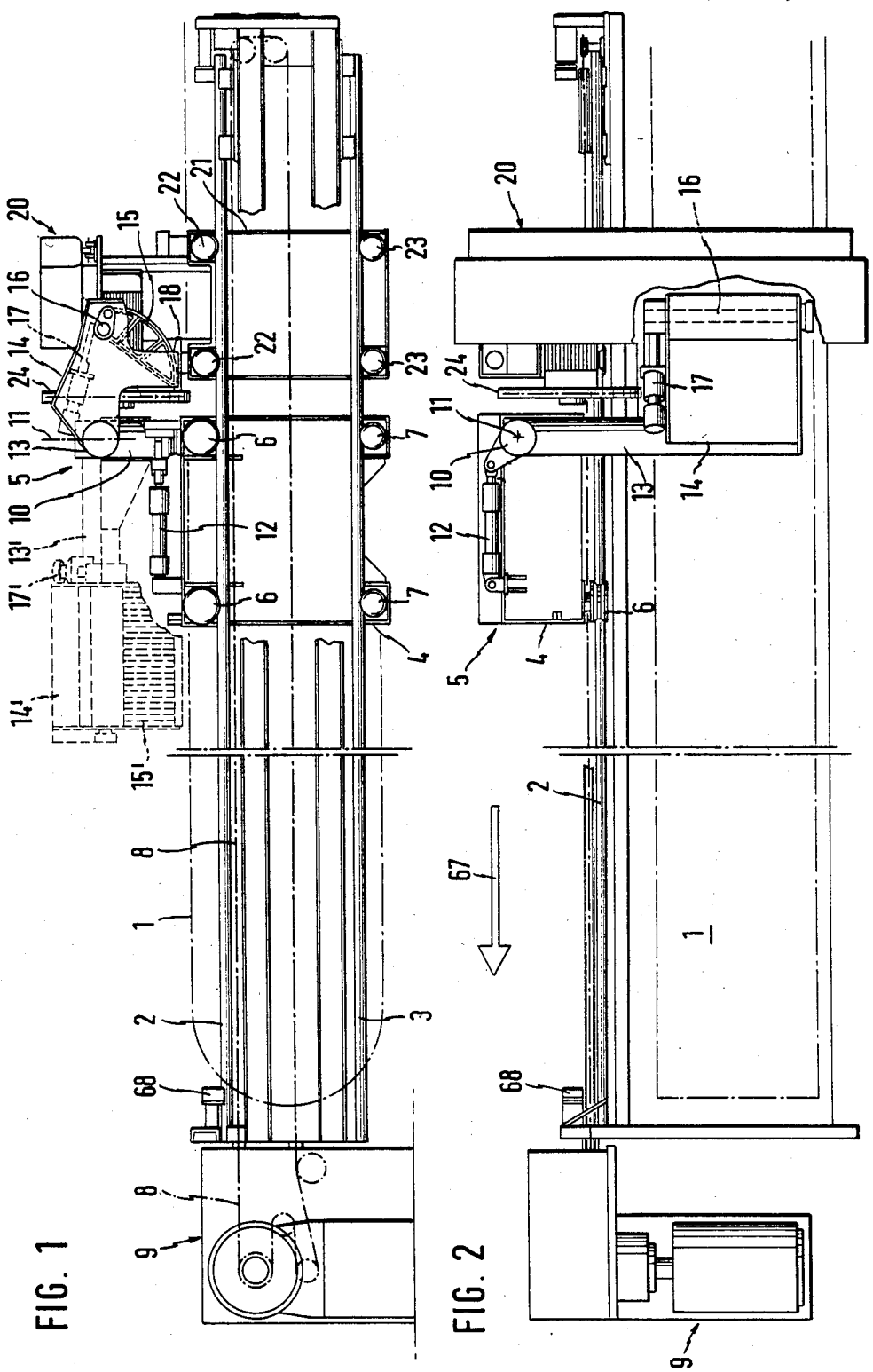

PROFILE EXTRUDER INCLUDING PULL MEASURING MEANS

BRIEF DESCRIPTION OF THE PRIOR ART

The invention relates to a pull measuring system in a puller for extrusion profiles extruded out of an extruder, comprising a carriage which is movable by a controllable drive means along a runout conveyor and includes a puller head arranged at a cantilever and entraining the extrusion profiles by means of a clamping gripper at controllable pull, a force detector being provided to sense the pull which prevails in operation and apply the same as an instantaneous value to a control means for controlling the carriage drive.

With pullers of the kind described above it is aimed at keeping the pull constant which acts on an extruded profile during the entire extrusion process. As is known, a rather constant pull is obtained by having the drive means of the carriage provide a constant drive torque, in case of rotational engines or a constant pull, in case of linear motors, by predetermining a certain armature current in an electric motor or a certain pressure in an hydraulic engine. The rotary speed of the drive means adapts itself to the rectilinear speed of the extrusion profile while, at the same time, the adjusted tensile force remains unchanged. Upon subtraction of the frictional loss and other losses of the drive means the result is the useful force acting at the puller head.

During the accelerating phase, i.e. at the beginning of the extrusion process when the profile is accelerated from its position of rest to the extrusion speed in the order of from 40 to 80 m/min. the carriage is not quick enough to follow the rise in speed because of the forces due to inertia of the drive means and carriage. Thus the pull remains below the desirable value until the pulling carriage has reached the extrusion speed. If the pull or tensile force selected is relatively low, this may take a relatively long time and during this time the pull exerted on the extrusion profile is too low and not under control.

In a known pull measuring system of the kind recited initially (DE-OS No. 29 33 262) the pivotable cantilever which carries the puller head is supported on the carriage through the intermission of a pressure sensor. The forces due to inertia of the cantilever and the unfavorable power ratio cause difficulties: small carriage speed variations produce great changes of the tensile force measured because of the mass moment of inertia of the pivotably supported cantilever with its puller head.

SUMMARY OF THE INVENTION

It is, therefore, an object of the invention to modify a pull measuring system of the kind specified initially such that disturbances of the nature described are avoided.

To meet this object it is provided, in accordance with the invention, that the puller head of a puller of the kind specified comprises two parts, one of which is supported for displacement with respect to the other one in or against the direction of pull and carries the clamping grippers and the other one of which is arranged at the cantilever, the one part preferably being supported for pivoting about an axis, and that a tension member is fixed to one of the two parts to cooperate in force transmitting contact, when in operation, with the force detector which is fixed to the other part.

The actual pull exerted by the puller head on the extrusion profile can be detected and transmitted to the control means in reliable manner under any operating conditions by this pull measuring system. Therefore, a constant pull can be obtained during the entire extrusion process, particularly during the acceleration phase.

BRIEF DESCRIPTION OF THE DRAWINGS

The invention will be described further, by way of example, with reference to the accompanying drawings, in which:

FIG. 1 is a diagrammatic side elevational view of a puller arranged along a runout conveyor in a position ready to take up one or more extrusion profiles, FIG. 2 is a top plan view of the puller shown in FIG. 1.

DETAILED DESCRIPTION

Figure 3:
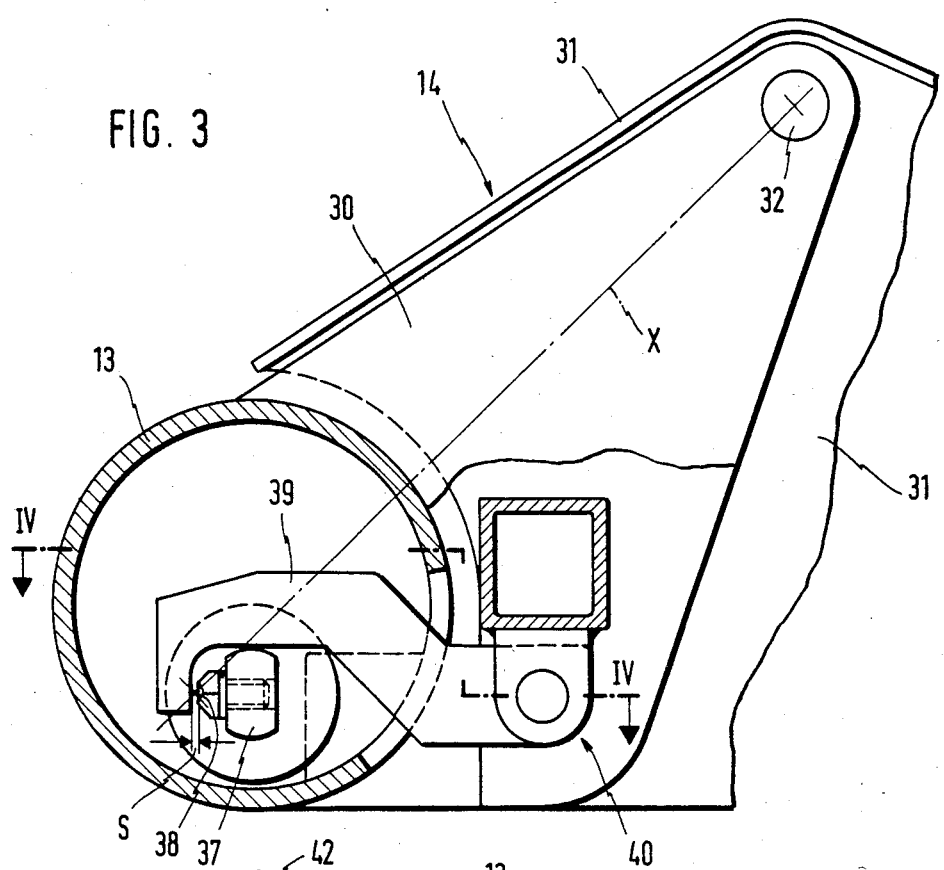
FIG. 3 is a sectional view taken along line III—III of FIG. 4, showing a detail in the vicinity of reference numeral 11 in FIG. 1.

FIGS. 1 and 2 show the puller arranged along an endless runout conveyor illustrated in phantom in FIGS. 1 and 2.

Parallel rails 2 and 3 are arranged approximately vertically above each other along the runout conveyor 1. The carriage 4 of the puller designated in general by reference numeral 5 runs by way of two upper rollers 6 and two lower rollers 7.

The carriage 4 is driven by an endless chain 8 which is movable in both directions by a drive means 9.

The carriage 4 of the puller 5 carries a vertical column 10 which is pivotable about a vertical pivot axis 11 by means of a pressure fluid cylinder 12 between two limit positions shown in FIGS. 1 and 2, one limit position being shown in continuous lines in FIGS. 1 and 2 and the other one being shown in discontinuous lines in FIG. 1. In the operating position, shown in continuous lines, a cantilever arm 13 which is rigidly connected with column 10 extends transversely of the runout conveyor. In the rest or return position shown in discontinuous lines in FIG. 1, on the other hand, this arm, designated 13', extends parallel to the runout conveyor 1. The column 10 is pivotable by a pressure fluid cylinder 12 from the rest position into the operating position.

The cantilever arm 13 carries a puller head 14, designated 14' in the rest position according to FIG. 1. The puller head carries a plurality of clamping segments 15,15' (return position in discontinuous lines) over almost the entire width of the runout conveyor. The clamping segments are mounted on the puller head 14 for pivoting movement about a horizontal axis 16 and are pivotable by means of a pressure fluid cylinder 17 with respect to a fixed clamping jaw 18 which is rigidly connected to the puller head 14. Clamping segments 15 and the clamping jaw 18 together form the clamping grippers.

The puller is shown in FIGS. 1 and 2 in ready position to receive extrusion profiles. The carriage 4 is in its right terminal position on the rails 2,3 next to a severing means designated in general by reference numeral 20. This severing means is likewise movable on the rails 2,3 by means of a slide 21 with rollers 22,23, the range of movement extending between the right terminal position of the carriage 4 and the right end of the rail adjacent the die opening (not shown) of an extruder.

Figure 4:
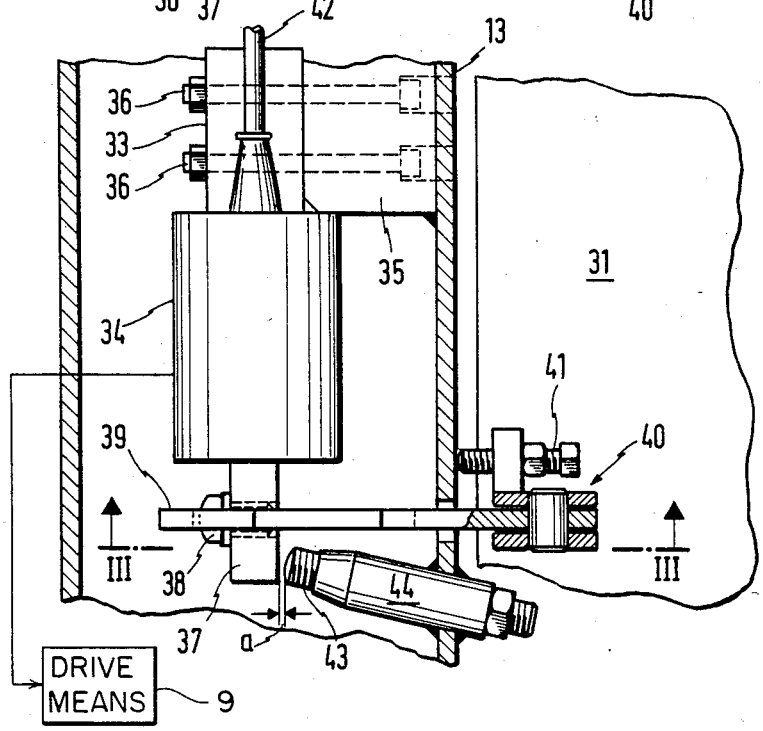
FIG. 4 is a sectional presentation along line IV—IV in FIG. 3.

The puller head 14 is divided into two parts 30 and 31 in FIGS. 3 and 4. Part 30 is connected firmly to the tubular cantilever arm 13. Part 31 which is the part carrying the clamping segments 15 is supported for pivoting movement with respect to part 30 by means of an axis 32 extending parallel to the cantilever arm 13 and transversely of the direction of pull 67 (FIG. 2).

One end of a commercially available force detector 34 (e.g. force detector Z 6H2 Messrs. Hottinger Baldwin Messtechnik GmbH, data sheet D21.22.1) is connected to the cantilever arm 13 by way of a block 35 and bolts 36. The other end 37 of the force detector 34 includes the point of application of force, embodied by a conical head bolt 38. The axis 32 is located at a distance x from the point of application of force 38. In operation a tie bar 39 acts on the point of application of force and straddles the other end 37 of the force detector 34, the tie bar being held in a fishplate structure 40 at part 31. The fishplate structure 40 and thus part 31 and the tie bar 39 are angularly adjustable with respect to part 30 about the axis 32 by means of setscrews 41. By virtue of this arrangement the clearance s at the point of application of force 38 between the end 37 of the force detector 34 and the tie bar 39 can be adjusted to a value which corresponds to a desired dead pivot angle between parts 30 and 31 upon transition from the force-free position of the puller head 14 into the force transmitting position thereof. The necessary sensitivity of the clearance adjustment is warranted by the rather great distance x of the point of application of force 38 from the axis 32. The measuring body (not shown) furnished with wire strain gauges (likewise not shown) and positioned between the ends 37 and 33 of the force detector 34 in operation is subjected to bending stress by the tie bar 39. The extension of the wire strain gauges thus caused is converted into an electrical voltage which is proportional to the pull exerted by way of the tie bar 39 and applied by cable 42 to a control means (not shown).

Reference numeral 43 designates a setscrew of an adjustable stop the tubular body 44 of which is connected firmly to the cantilever arm 13. This adjustable stop 43 is useful to limit the deflection a of the end 37 of the force detector 34 to prevent the force detector 34 from being overloaded.

The puller 5 is moved into the position of readiness as shown in FIGS. 1 and 2, in which position it is prepared to receive extrusion profiles coming out of the die opening.

The extrusion profile or profiles is/are advanced from the right in FIGS. 1 and 2 and are raised by a lifting means (not shown) so that their ends are passed from the plane of the runout conveyor 1 to the level of the surface of the fixed clamping jaw 18 and introduced into the puller head 14 between the fixed clamping jaw 18 and the clamping segments 15 which automatically become raised in agreement with possibly given different thicknesses of the extrusion profile, by corresponding pivoting movements about the axis 16. In this manner the clamping is effected of the extrusion profile or profiles. The puller 5 then is moved at controlled tensile force in the direction of pull 67 (FIG. 2) along the runout conveyor. The speed of movement adapts itself to the running speed of the extrusion profiles, while the pull is maintained as adjusted. The pull is controlled to a constant value, and the instantaneous value is sensed by the force detector 34 in the manner described.

When the end of the runout path at the very left in FIGS. 1,2 is reached, the carriage 4 moves up against a stop 68 which actuates limit switches for switching off the drive means 9 and switching on the pressure fluid cylinder 17. The latter pivots clamping segments 15 into the release position. Also operated is pressure fluid cylinder 12 so as to pivot the cantilever arm 13 together with the puller head 14 into the return position shown in discontinuous lines in FIG. 1, the cantilever arm 13 being positioned parallel to and above rail 2, as seen in FIG. 1. In this return position the puller 5 is returned at high speed, the carriage 4 moving into the position as per FIGS. 1 and 2. In this position the cantilever arm 13 is pivoted back into ready state from the discontinuous line position 13' shown in FIG. 1 into the continuous line position shown in FIGS. 1 and 2. In this position the puller head comes to lie under the severing means and is ready to receive another extrusion profile.

What is claimed is:

1. Apparatus for measuring the pull force applied by a puller head to an extrusion profile as it is extruded out of an extruder along a runout conveyor (1), comprising
    (a) carriage means (4) mounted for displacement along the runout conveyor by controllable drive means (9);
    (b) puller head means (14) including gripper head means (15,18) for gripping an extruded profile;
    (c) means including a cantilever arm (13) connecting said puller head means with said carriage means for displacement between operable and retracted positions relative to said runout conveyor;
    (d) said puller head means including a pair of relatively displaceable members (30,31) a first one (30) of which is connected with said cantilever arm and a second one (31) of which carries the profile gripping means, said second member (31) being movably connected to said first member; and
    (e) force detecting means connected between said first and second puller head members for supplying a pull responsive control signal to said drive means, comprising
        (1) a force detector (34) connected with one of said puller head members; and
        (2) a tension member (39) connected with the other of said puller head members for transmitting the pull force to said force detector.

2. Apparatus as defined in claim 1, wherein said first and second puller head members are connected for pivotal movement about a pivot axis (32) that extends transversely to the direction of profile pull (67) and which is spaced a distance (x) from the point (38) of application of force to said force detector by said tension member.

3. Apparatus as defined in claim 2, wherein said tension member is spaced slightly by a given clearance (s) from said force detector, and means including a nut-screw (41) for varying the clearance distance.

4. Apparatus as defined in claim 1, wherein said tension member applies a bending stress to said force detector, said tension member (39) including at one end a hook-shaped configuration for engagement with said force detector transversely of the longitudinal axis thereof.

5. Apparatus as defined in claim 4, and further including adjustable stop means (43) for limiting the extent of bending deflection of said force detector by said tension member.

* * * * *